A. A. PARISH.
HAY FORK.
APPLICATION FILED NOV. 17, 1908.
923,072.
Patented May 25, 1909.
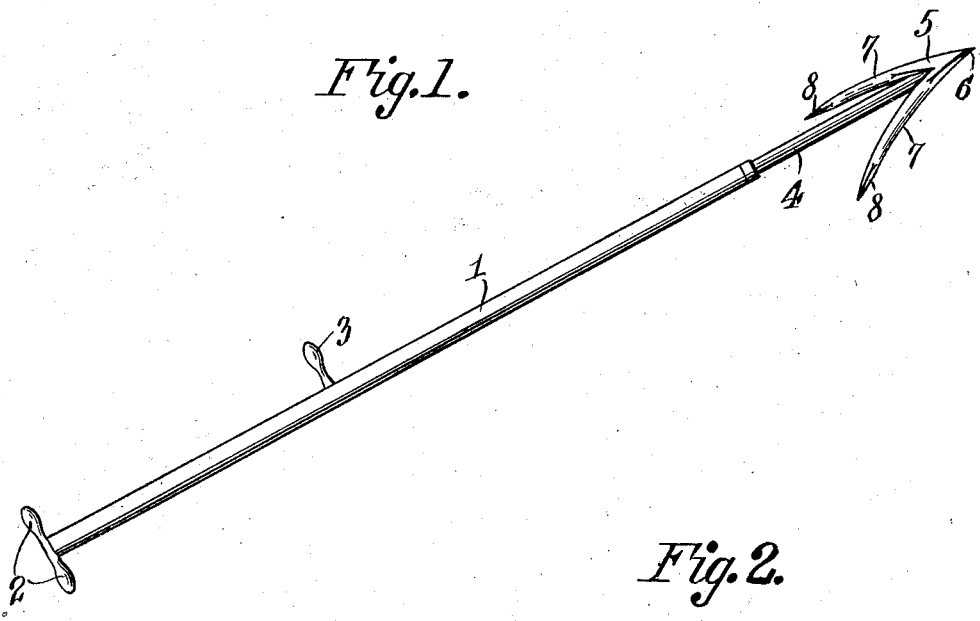
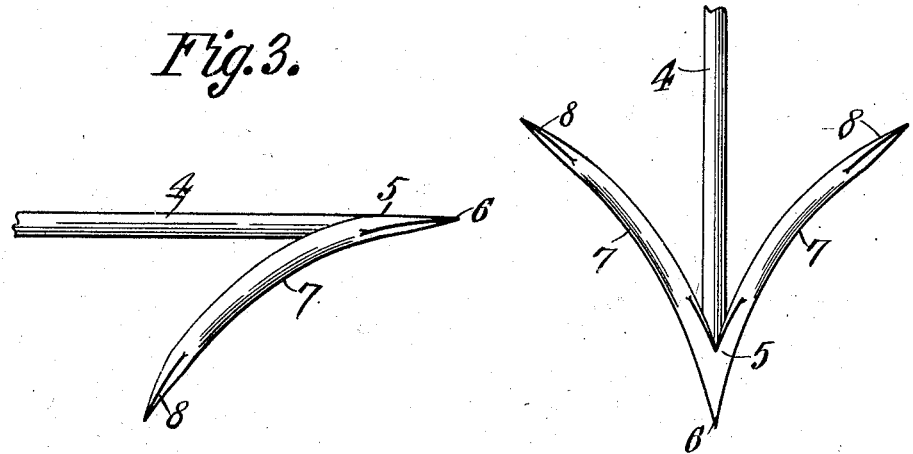
Witnesses
William C. Linton
C. C. Hines
Inventor
Arthur A. Parish.
By Victor J. Evans
Attorney
THE NORRIS PETERS CO., WASHINGTON, D. C.

UNITED STATES PATENT OFFICE.

ARTHUR A. PARISH, OF WICHITA, KANSAS.

HAY-FORK.

No. 923,072.  Specification of Letters Patent.  Patented May 25, 1909.

Application filed November 17, 1908. Serial No. 463,102.

*To all whom it may concern:*

Be it known that I, ARTHUR A. PARISH, a citizen of the United States, residing at Wichita, in the county of Sedgwick and State of Kansas, have invented new and useful Improvements in Hay-Forks, of which the following is a specification.

This invention relates to hay forks, the object of the invention being to provide a novel construction of fork which may be driven into the side of a rick or stack of hay, straw or other stacked material and withdrawn to remove a large amount of the hay, straw or other material without injury to the top or sides of the stack or impairing the stability of the stack.

In the accompanying drawing:—Figure 1 is a perspective view of a hay fork embodying my invention. Fig. 2 is a top plan view of the fork proper. Fig. 3 is a side view of the same.

Referring to the drawing, 1 designates a handle of suitable length and made of suitable material. This handle is provided at its rear end with transverse grips 2 and at a suitable point in advance thereof with a grip 3.

A shank 4 projects from the forward end of the handle, and may be integral with said handle or made independently thereof and secured thereto. This shank is formed or provided at its forward end with a head 5 tapering to a penetrating point 6, and from said head extend a pair of rearwardly extending arms 7 disposed on opposite sides of the plane of the shank. The arms curve outwardly and rearwardly in divergent relation, and also curve downwardly, and terminate in pointed ends 8. By this construction the arms form gathering hooks which converge to the pointed head and provide a hooked V-shaped fork which may be easily inserted into the side of a stack and withdrawn with a large quantity of the material, without displacing the remainder of the material and causing collapse of the stack. This device is in this respect superior to an ordinary pitchfork, which cannot be used without danger of injury to the stack. It will, of course, be understood that the shank, head and arms may be made of iron, steel or wood or partially of wood and metal, as may be desired.

Having thus fully described the invention, what is claimed as new is:—

A fork comprising a handle provided with a penetrating head, and arms diverging rearwardly from said head, said arms being disposed on opposite sides of the plane of the handle and curved downwardly and rearwardly from the head.

In testimony whereof I affix my signature in presence of two witnesses.

ARTHUR A. PARISH.

Witnesses:
HERBERT W. TURNER,
J. N. CHAPPLE.